(12) United States Patent
Kim et al.

(10) Patent No.: US 12,035,047 B2
(45) Date of Patent: Jul. 9, 2024

(54) CAMERA MODULE INSPECTION SYSTEM AND METHOD FOR OPERATING THE SAME

(71) Applicant: PAMTEK Co., Ltd., Hwaseong-si (KR)

(72) Inventors: Jae Woong Kim, Hwaseong-si (KR); Jung In Park, Hwaseong-si (KR); Hyun Wook Shin, Suwon-si (KR); Kyung Sub Oh, Seoul (KR)

(73) Assignee: PAMTEK CO., LTD., Hwaseong-si (KR)

( * ) Notice: Subject to any disclaimer, the term of this patent is extended or adjusted under 35 U.S.C. 154(b) by 108 days.

(21) Appl. No.: 18/083,540

(22) Filed: Dec. 18, 2022

(65) Prior Publication Data

US 2023/0412926 A1    Dec. 21, 2023

(30) Foreign Application Priority Data

Jun. 17, 2022  (KR) .................. 10-2022-0074262

(51) Int. Cl.
| | | |
|---|---|---|
| *G01M 11/02* | (2006.01) | |
| *G02B 7/00* | (2021.01) | |
| *G03B 30/00* | (2021.01) | |
| *G06V 10/24* | (2022.01) | |
| *G06V 10/74* | (2022.01) | |
| *H04N 17/00* | (2006.01) | |
| *H04N 23/57* | (2023.01) | |
| *H04N 23/695* | (2023.01) | |

(52) U.S. Cl.
CPC ...... *H04N 23/695* (2023.01); *G01M 11/0242* (2013.01); *G02B 7/005* (2013.01); *G03B 30/00* (2021.01); *G06V 10/242* (2022.01); *G06V 10/245* (2022.01); *G06V 10/761* (2022.01); *H04N 17/002* (2013.01); *H04N 23/57* (2023.01); *G06V 2201/07* (2022.01)

(58) Field of Classification Search
CPC .... H04N 17/002; H04N 23/57; H04N 23/695; G01M 11/00; G01M 11/02; G01M 11/242; G01R 1/0416; G01R 31/2844; G02B 7/00; G02B 7/004; G02B 7/005; G03B 30/00; G06V 10/242; G06V 10/245; G06V 10/761; G06V 2201/06; G06V 2201/07
See application file for complete search history.

(56) References Cited

U.S. PATENT DOCUMENTS

2022/0116585 A1* 4/2022 Lee .................. H04N 17/00

* cited by examiner

*Primary Examiner* — Lin Ye
*Assistant Examiner* — Chriss S Yoder, III
(74) *Attorney, Agent, or Firm* — Tucker Ellis LLP

(57) ABSTRACT

A camera module inspection system and a method for operating the inspection system. More specifically, the inspection system can quickly check and correct the alignment of the camera module.

8 Claims, 10 Drawing Sheets

(a)

(b)

CAMERA MODULE INSPECTION SYSTEM AND METHOD FOR OPERATING THE SAME

RELATED APPLICATION DATA

This application claims the benefit of Korean Patent Application No. KR 10-2022-0074262, filed Jun. 17, 2022, the content of which is incorporated herein by reference in its entirety.

BACKGROUND OF THE INVENTION

1. Technical Field

The present disclosure relates to a camera module inspection system and a method for operating the inspection system. More specifically, the inspection system can quickly check and correct the alignment of the camera module.

2. Description of Related Art

With the development of smart devices, the use of small camera modules is rapidly increasing. Recently, camera modules have been installed not only in portable terminals such as smart phones, tablet PCs and laptops, but also in automobiles and smart TVs.

A typical camera module includes a housing, a lens barrel in which a plurality of lenses are stacked, a CCD or CMOS image sensor, and a connector electrically connecting a board on which they are mounted and the outside.

In the process of assembling the camera module, parts of the camera module must be transferred to a plurality of assembly devices. In addition, the camera module must be transferred to a plurality of inspection devices that perform specific inspections to inspect whether the assembly is properly performed or whether the AF (Auto Focus) or OIS (Optical Image Stabilization) of the camera module operates correctly. A plurality of assembly devices may perform assembly by receiving the parts of the camera module having a predetermined orientation for assembly.

However, the alignment of the camera modules may be disturbed in the process of being transported, and when the alignment of the camera modules with respect to the inspection device or the assembly device is disturbed, inspection or assembly may not be performed properly. In addition, when inspection or assembly is attempted while the alignment is disturbed, a strain is applied to the camera module, and the camera module may be damaged.

Conventionally, in order to align the camera module and the inspection device or assembly device, a method of aligning the camera module by inserting it into a mechanical frame at a predetermined position has been used in some cases. However, since the inspection device or the assembly device includes many parts, the mechanical coupling becomes loose over time, resulting in a high defect rate.

SUMMARY OF THE INVENTION

The camera module inspection system according to one embodiment of the present disclosure comprises a control unit, an alignment camera, an alignment stage, and a support socket, and the method for operating the inspection system includes obtaining an image of the camera module by photographing a predetermined region of the camera module above the support socket by the alignment camera, comparing the image of the camera module with the first pattern image to obtain a position of a first point included in the image of the camera module, comparing the image of the camera module with a second pattern image to obtain a position of a second point included in the image of the camera module, and obtaining a central position of the position of the first point and the position of the second point, obtaining an alignment line connecting the position of the first point and the position of the second point, obtaining a difference vector between the center position and a predetermined reference position, obtaining a rotation angle between the alignment line and a predetermined reference line, and driving the alignment stage based on at least one of the difference vector and the rotation angle so that the center position is located at the reference position and the alignment line coincides with a predetermined reference line.

The inspection system according to one embodiment of the present disclosure includes a base unit constituting a framework of the inspection system, an alignment stage coupled to the upper side of the base unit and for determining the direction of the support socket, a support socket coupled to the upper side of the alignment stage and for supporting the camera module, an alignment camera spaced apart from the upper side of the support socket by a predetermined distance and fixed at a predetermined position in order to photograph an alignment state of the camera module placed on the support socket, an inspection board driving unit coupled to an upper side of the base unit, positioned in a first direction of the alignment stage, and configured to move an inspection board in the first direction or in a direction opposite to the first direction, and an inspection board coupled to the upper side of the inspection board driving unit and for inspecting the camera module on the support socket, and wherein the first direction is a direction parallel to the ground.

The inspection system according to one embodiment of the present disclosure discloses that the alignment stage may include a first stage coupled to an upper side of the base unit to move the support socket in a second direction or in a direction opposite to the second direction, a second stage coupled to an upper side of the first stage to move the support socket in the first direction or in a direction opposite to the first direction and a third stage coupled to the upper side of the second stage to rotate the support socket about an axis perpendicular to the ground and wherein the first direction and the second direction are perpendicular to each other.

The method of operating an inspection system according to one embodiment of the present disclosure discloses that the first pattern image and the second pattern image include a positioning point at a predetermined position, and wherein obtaining the position of the first point comprises determining a first region most similar to a first pattern image in the image of the camera module and obtaining a position in the first region corresponding to the position of the positioning point of the first pattern image as the position of the first point, wherein obtaining the position of the second point comprises determining a second region most similar to a second pattern image in the image of the camera module and obtaining a position in the second region corresponding to the position of the positioning point of the second pattern image as the position of the second point, and wherein the second pattern image is a mirror image or an image rotated by 180 degrees of the first pattern image.

The method of operating an inspection system according to one embodiment of the present disclosure discloses that obtaining a position within the first region as the position of the first point comprises outputting a signal indicating that there is an abnormality in the camera module when the similarity between the first region and the first pattern image is less than a predetermined threshold similarity; and obtaining a position in the first region corresponding to the position of the positioning point of the first pattern image as the position of the first point contains steps, when the similarity between the first region and the first pattern image is greater than or equal to the threshold similarity, and wherein obtaining a position in the second region as the position of the second point comprises outputting a signal indicating that there is an abnormality in the camera module when the similarity between the second region and the second pattern image is less than the threshold similarity and obtaining a position in the second region corresponding to the position of the positioning point of the second pattern image as the position of the second point, when the similarity between the second region and the second pattern image is greater than or equal to the threshold similarity.

The method of operating an inspection system according to one embodiment of the present disclosure comprises determining a difference distance between the position of the first point and the position of the second point after the step of obtaining the position of the second point, determining an absolute value of a difference between the difference distance and a predetermined basic distance, outputting a signal indicating that there is an abnormality in the camera module when the absolute value is greater than or equal to a predetermined tolerance, and obtaining the center position or the alignment line when the absolute value is less than a predetermined tolerance.

The method of operating an inspection system according to one embodiment of the present disclosure discloses that a first inspection board alignment point and a second inspection board alignment point are displayed on the upper side of the inspection board, and the method of operating an inspection system comprises moving the inspection board in a direction opposite to the first direction by using the inspection board driving unit, obtaining an image of the inspection board using the alignment camera, determining the position of the first inspection board alignment point and the second inspection board alignment point in the image of the inspection board, determining the center of the position of the first inspection board alignment point and the position of the second inspection board alignment point as the reference position, determining a line connecting the position of the first inspection board alignment point and the position of the second inspection board alignment point as the reference line, moving the inspection board in the first direction by using the inspection board driving unit, and obtaining an image of the camera module by the alignment camera photographing a predetermined region of the camera module on the support socket.

The method of operating an inspection system according to one embodiment of the present disclosure comprises moving the inspection board in a direction opposite to the first direction by using the inspection board driving unit after the step of driving the alignment stage, moving the inspection board downward to couple the camera module and the inspection board on the support socket, obtaining a test result by testing the camera module using the inspection board, separating the camera module and the inspection board by moving the inspection board upward, and moving the inspection board in the first direction by using the inspection board driving unit.

In addition, a program for implementing the above-described operating method of the inspection system may be recorded on a computer-readable recording medium.

DESCRIPTION OF THE PREFERRED EMBODIMENTS

Figure 1:
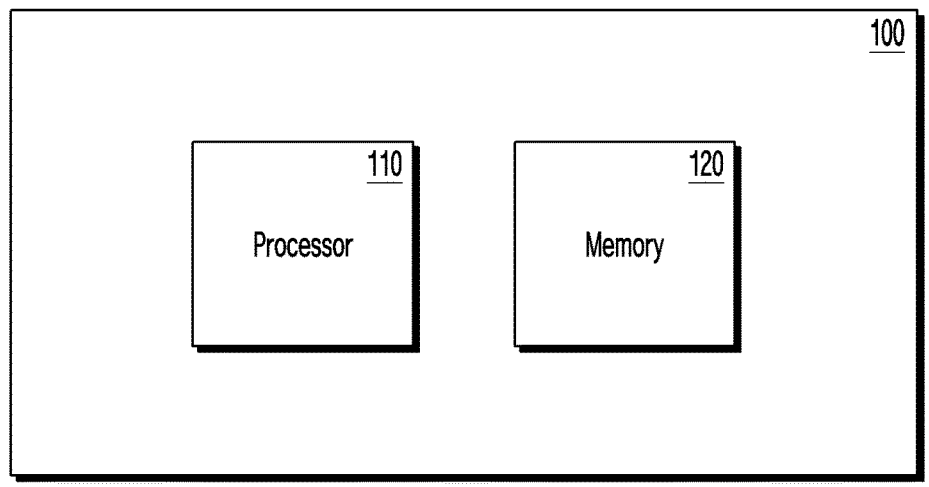
FIG. 1 discloses a hardware configuration of a control unit according to an embodiment of the present disclosure.

Advantages and features of the disclosed embodiments, and methods of achieving them, will become clear with reference to the following embodiments in conjunction with the accompanying drawings. However, the present disclosure is not limited to the embodiments disclosed below and may be implemented in various forms, only the present embodiments make the present disclosure complete, and those of ordinary skill in the art to which the present disclosure belongs It is provided only to fully inform the person of the scope of the invention.

Terms used in this specification will be briefly described, and the disclosed embodiments will be described in detail.

The terms used in this specification have been selected from general terms that are currently widely used as much as possible while considering the functions in the present disclosure, but they may vary according to the intention of a person skilled in the related field, a precedent, or the emergence of new technologies. In addition, in a specific case, there is also a term arbitrarily selected by the applicant, and in this case, the meaning will be described in detail in the description of the invention. Therefore, terms used in the present disclosure should be defined based on the meaning of the term and the overall content of the present disclosure, not simply the name of the term.

Expressions in the singular number in this specification include plural expressions unless the context clearly dictates that they are singular. Also, plural expressions include singular expressions unless the context clearly specifies that they are plural.

When it is said that a certain part "includes" a certain component throughout the specification, it means that it may further include other components, not excluding other components unless otherwise stated.

Also, the term "unit" used in the specification means a software or hardware component, and "unit" performs certain roles. However, "unit" is not meant to be limited to software or hardware. A "unit" may be configured to reside in an addressable storage medium and may be configured to reproduce on one or more processors. Thus, as an example, "unit" can refer to components such as software components, object-oriented software components, class components and task components, processes, functions, properties, procedures, subroutines, segments of program code, drivers, firmware, microcode, circuitry, data, databases, data structures, tables, arrays and variables. Functionality provided within components and "parts" may be combined into fewer components and "parts" or further separated into additional components and "parts".

According to an embodiment of the present disclosure, "unit" may be implemented as a processor and a memory. The term "processor" should be broadly interpreted to include general-purpose processors, central processing units (CPUs), microprocessors, digital signal processors (DSPs), controllers, microcontrollers, state machines, and the like. In some circumstances, "processor" may refer to an application specific integrated circuit (ASIC), programmable logic device (PLD), field programmable gate array (FPGA), or the like. The term "processor" may also refer to a combination of processing devices, such as, for example, a combination of a DSP and a microprocessor, a combination of a plurality of microprocessors, a combination of one or more microprocessors in conjunction with a DSP core, or any other such configuration.

The term "memory" should be broadly interpreted to include any electronic component capable of storing electronic information. The term memory includes random access memory (RAN), read-only memory (ROM), non-volatile random access memory (NVRAM)), programmable read-only memory (PROM), erasable-programmable read-only memory (EPROM), electrically erasable programmable read-only memory (EEPROM), flash memory, magnetic or optical data storage, various types of processor-readable media, such as registers, and the like. A memory is said to be in electronic communication with the processor if the processor can read information from and/or write information to the memory. Memory integrated with the processor is in electronic communication with the processor.

Hereinafter, with reference to the accompanying drawings, embodiments will be described in detail so that those skilled in the art can easily carry out the embodiments. And in order to clearly describe the present disclosure in the drawings, parts irrelevant to the description are omitted.

FIG. 1 discloses a hardware configuration of a control unit according to an embodiment of the present disclosure.

The inspection system for inspecting the camera module 200 may include a control unit 100 for controlling the operation of the inspection system. The control unit 100 may include a processor 110 and a memory 120. The processor 110 executes instructions stored in the memory 120. The control unit 100 may control movement of components included in the inspection system based on commands stored in the memory 120. The control unit 100 may be implemented in hardware or software. The control unit 100 may be implemented only with hardware for performing a corresponding function. However, it is not limited thereto, and the control unit 100 may be implemented as a general-purpose processor 110, and the general-purpose processor 110 of the control unit 100 may be implemented to execute a program stored in the memory 120. Hereinafter, components included in the inspection system will be described, and a process for the control unit 100 to control various components included in the inspection system will be described.

Figure 2:
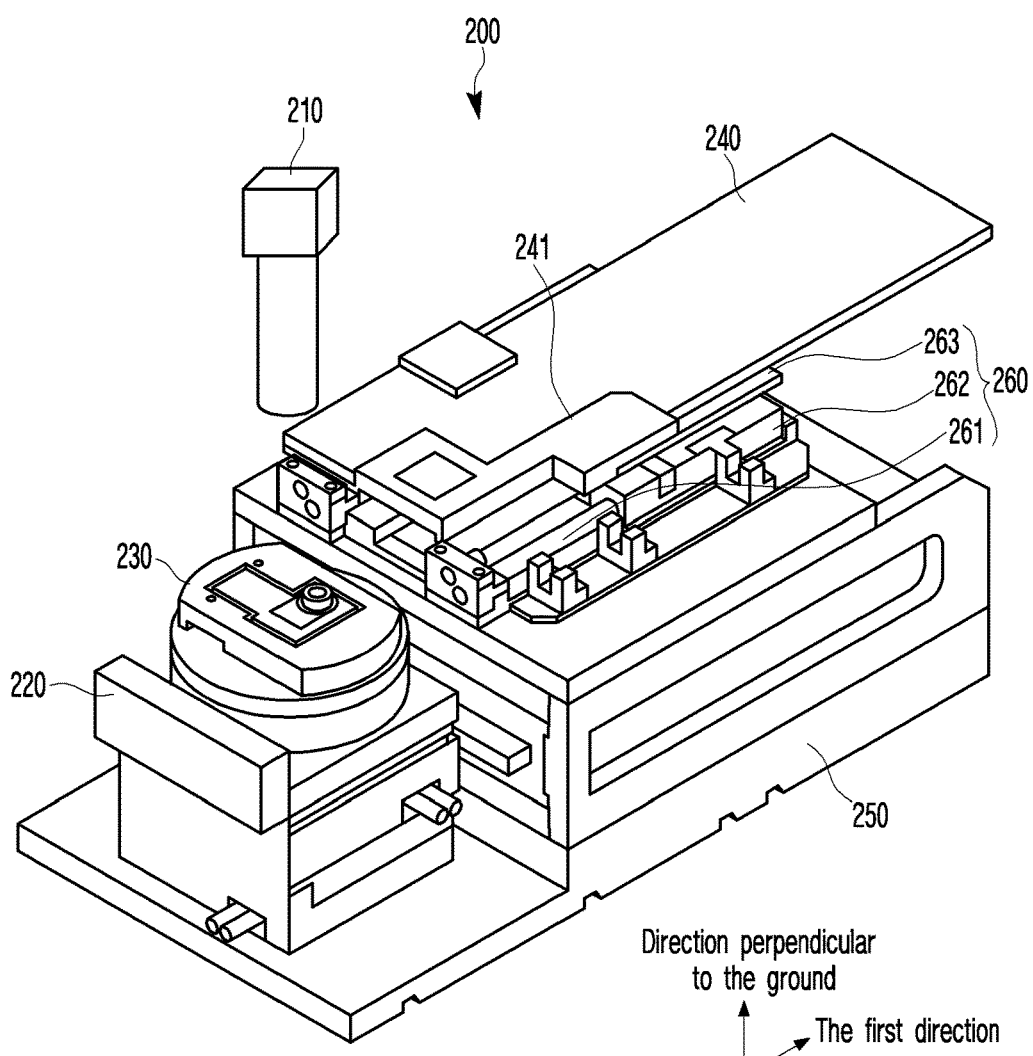
FIG. 2 is a drawing showing hardware of an inspection system according to an embodiment of the present disclosure.
Figure 3:
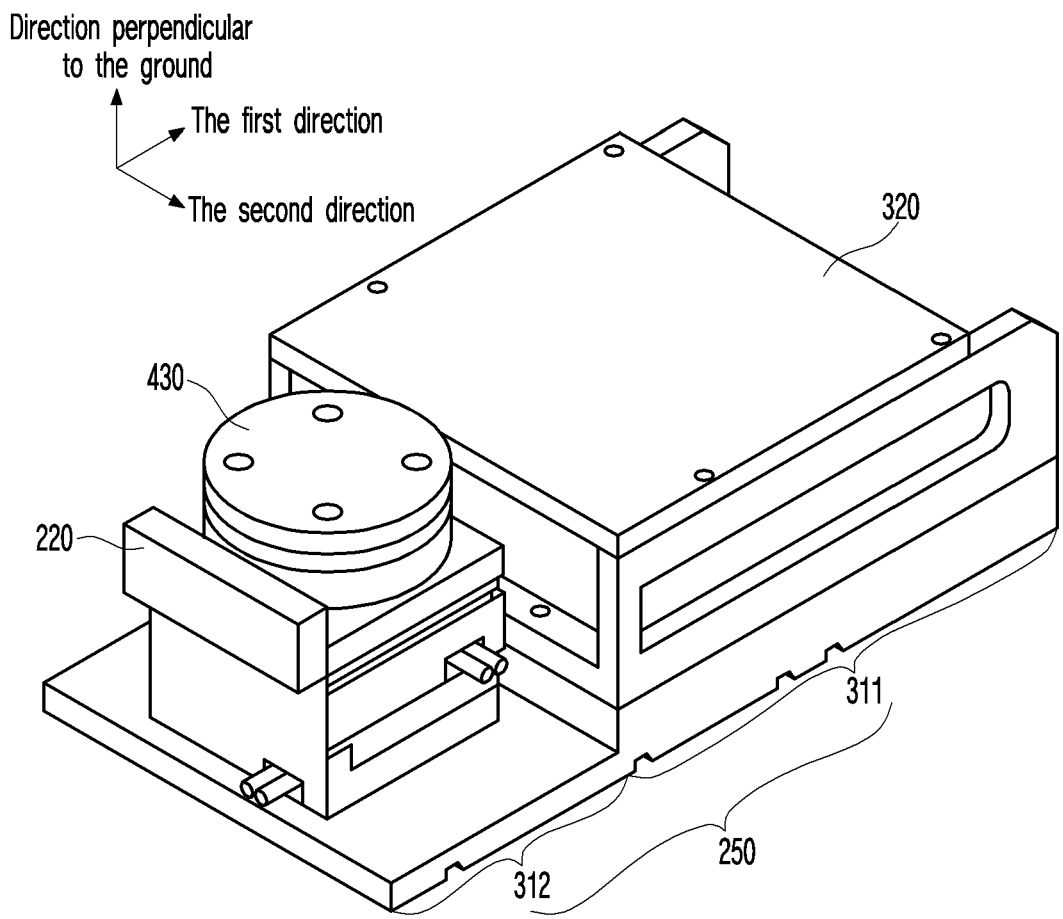
FIG. 3 is a drawing showing hardware of an inspection system according to an embodiment of the present disclosure.

FIG. 2 is a drawing showing hardware of an inspection system according to an embodiment of the present disclosure. FIG. 3 is a drawing showing hardware of an inspection system according to an embodiment of the present disclosure.

Since the control unit 100 has already been described, the remaining hardware constituting the inspection system 200 will be described in more detail below.

Referring to FIGS. 2 and 3, the inspection system 200 may include a base unit 250 forming a skeleton of the inspection system 200. The base unit 250 may be implemented with a metal material. In addition, the base unit 250 may include an inspection board accommodating unit 311 for accommodating the inspection board 240 and a stage accommodating unit 312 for accommodating the alignment stage 220. An upper surface of the inspection board accommodating unit 311 may be located higher than an upper surface of the stage accommodating unit 312. Since the stage accommodating unit 312 is positioned lower, a space for positioning a camera for aligning the position of the camera module or an inspection board for inspecting the camera module above the camera module may be secured. In addition, since all the devices for alignment and inspection are located above the camera module, the moving distance of the devices is shortened and the inspection time is shortened, thereby increasing inspection efficiency.

A space may be formed between the lower surface and the upper surface of the inspection board accommodating unit 311. The control unit 100 may be disposed in the space formed in the inspection board accommodating unit 311. The control unit 100 may receive data from the server or transmit data to the server. The control unit 100 may control the operation of at least one of the alignment camera 210 and the alignment stage 220. The space formed between the lower surface and the upper surface of the inspection board accommodating unit 311 may not have a side surface. That is, the control unit may be disposed inside an open space rather than inside a closed space. Therefore, heat emitted from the control unit 100 and heat generated from the inspection system 200 can be quickly released. In the inspection system 200, the cooling efficiency may be increased by arranging a heat dissipation fan in a space formed between the lower surface and the upper surface of the inspection board accommodating unit 311. Since the inspection system 200 of the present disclosure uses a lot of image processing, the processing capability of the control unit 100 is greatly required, and the temperature of the control unit 100 increases, so that the control unit 100 may slow down due to throttling. However, it is possible not to worry about throttling of the control unit 100 by the above structure. Since the heat generated from the control unit 100 is not dissipated toward the camera module, it is possible not to affect the accuracy and speed of inspection.

Figure 4:
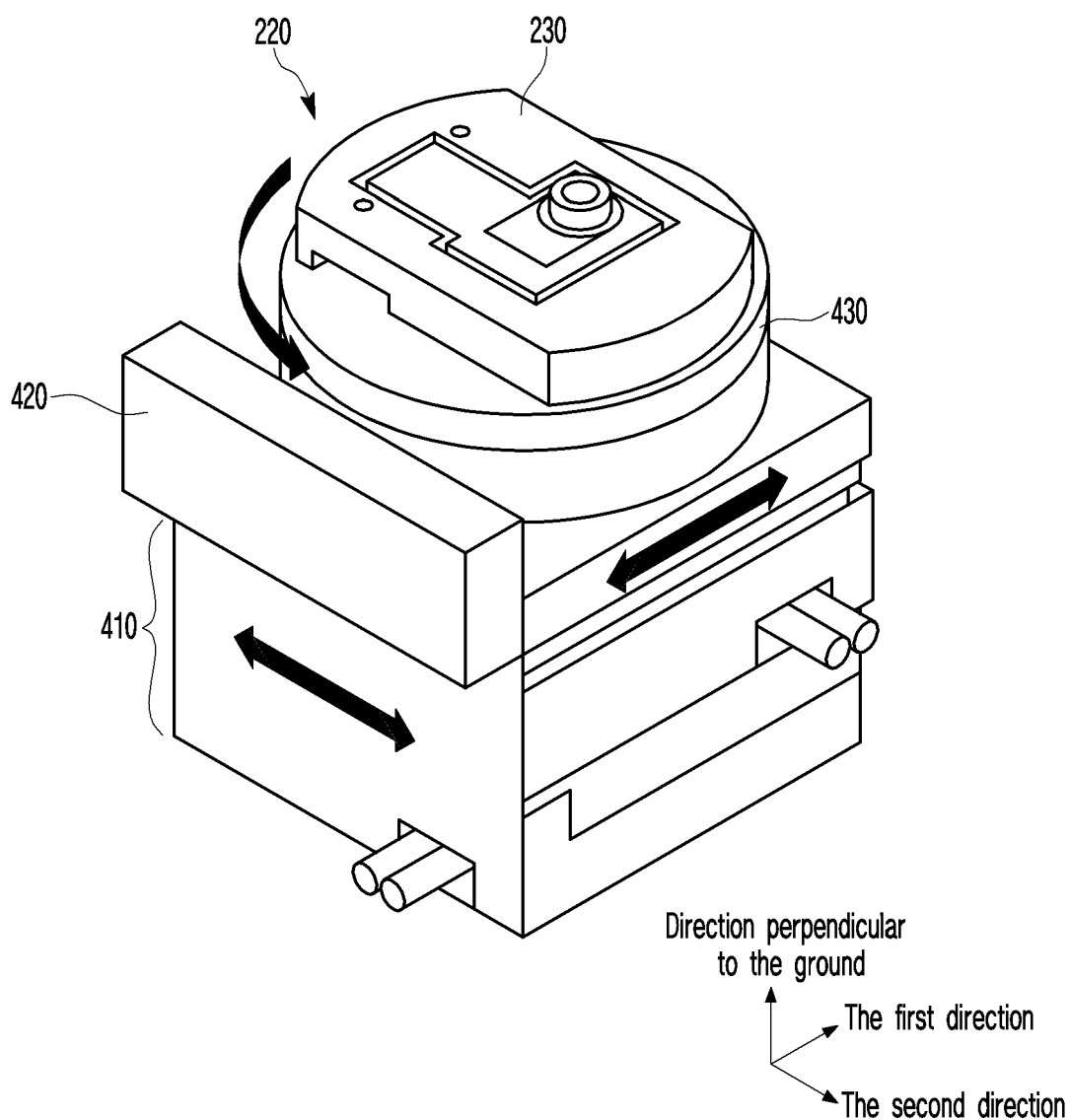
FIG. 4 is a drawing showing an alignment stage according to an embodiment of the present disclosure.

The inspection system 200 may include an alignment stage 220. The alignment stage 220 may be coupled to the upper side of the base unit 250. More specifically, the alignment stage 220 may be coupled to the upper side of the stage accommodating part 312. The alignment stage 220 may be configured to determine the direction of the support socket 230. FIG. 4 is briefly referred for r a description of the alignment stage 220.

FIG. 4 is a drawing showing an alignment stage according to an embodiment of the present disclosure.

The alignment stage 220 may include a first stage 410, a second stage 420, and a third stage 430.

The first stage 410 may be coupled to the upper side of the base unit 250. The first stage 410 may be configured to move the support socket 230 in a second direction or in a direction opposite to the second direction. Hereinafter, the first stage 410 will be mainly described as being configured to move the support socket 230 in a second direction or in a direction opposite to the second direction. However, it is not limited thereto, and the first stage 410 may be configured to move the support socket 230 in a first direction or in a direction opposite to the first direction. The first direction and the second direction may be directions parallel to the ground, and the first direction and the second direction may be perpendicular to each other.

The first stage 410 may include a base stage coupled to the base unit 250. A second direction guide rail may be formed above the base stage. The second direction guide rail may extend in the second direction. The first stage 410 may include a second direction movement stage on the base stage. A lower side of the second direction movement stage may include a slider. The slider of the second direction movement stage is coupled to the second direction guide rail of the base stage to slide in a second direction or in a direction opposite to the second direction. A first direction guide rail may be formed above the second direction movement stage. The first direction guide rail may extend in the first direction. The first direction guide rail may be configured to move the second stage 420 in a first direction or in a direction opposite to the first direction.

The second stage 420 may be coupled to an upper side of the first stage to move the support socket in a first direction or in a direction opposite to the first direction. A slide may be included on the lower side of the second stage 420. The slider of the second stage 420 is coupled to the first direction guide rail of the second direction movement stage and can slide in a first direction or in a direction opposite to the first direction. As already described, the second direction movement stage may be included in the first stage 410.

In the present disclosure, the second stage 420 is described as configured to move the support socket in a first direction or in a direction opposite to the first direction but is not limited thereto. The second stage 420 may be configured to move the support socket 230 in a second direction or in a direction opposite to the second direction.

The third stage 430 may be coupled to the upper side of the second stage to rotate the support socket about an axis perpendicular to the ground. As such, since the inspection system of the present disclosure includes the first stage 410, the second stage 420, and the third stage 430, the camera module to be inspected can be accurately positioned. Accordingly, damage to the connector of the camera module can be minimized. In addition, only the camera module needs to be aligned in an accurate position, and the other components move to a predetermined position to perform the inspection, so the inspection speed can be increased.

The movement of the first stage 410, the second stage 420, and the third stage 430 may be controlled by the control unit 100. Also, each of the first stage 410, the second stage 420, and the third stage 430 may include a driving unit. The driving unit may include at least one of a fluid cylinder and an electric motor. The first stage 410, the second stage 420, and the third stage 430 can be independently driven by the control unit 100. Each of the first stage 410, the second stage 420, and the third stage 430 may include an encoder. The control unit 100 may measure the position of the camera module in the first direction and the position of the camera module in the second direction, the rotation position of the camera module about an axis perpendicular to the ground based on the encoders included in the first stage 410, the second stage 420, and the third stage 430, respectively. In addition, the control unit 100 may measure positions after movement by the driving unit by means of encoders included in the first stage 410, the second stage 420, and the third stage 430, respectively.

The size (width, depth, height) of the first stage 410 and the second stage 420 may be approximately 70×70×25 mm. The maximum force of the driving units of the first stage 410 and the second stage 420 may be about 36N. Also, the resolution may be approximately 0.1 um (micrometer), and the maximum speed may be approximately 270 mm/s.

The size of the third stage 430 may be approximately 70×82×25 mm. The maximum torque of the third stage 430 may be about 0.6 Nm. Also, the resolution may be approximately 5847 pulse/degree, and the maximum speed may be approximately 720 degree/s.

Referring to FIG. 3, the upper surface of the third stage 430 and the upper surface 320 of the inspection board accommodating unit 311 may have substantially the same height.

Referring to FIGS. 2 and 3, the inspection system 200 may include a support socket 230. The support socket 230 is coupled to the upper side of the alignment stage 220 and may be configured to support the camera module. More specifically, the support socket 230 may be fixed to an upper end of the third stage 430. The support socket 230 may move in a first direction, in a direction opposite to the first direction, in a second direction, or in a direction opposite to the second direction by the first stage 410 to the third stage 430 or may rotate clockwise or counterclockwise about an axis perpendicular to the ground.

The inspection system 200 may include an alignment camera 210. The alignment camera 210 may be spaced apart from the upper side of the support socket 230 by a predetermined distance. Since no other equipment is provided on the upper side of the support socket 230 and the alignment camera 210 can be separated by a sufficient distance from the support socket 230, a relatively inexpensive camera can be used. Conventionally, since the positions of the inspection equipment as well as the camera module had to be measured, there was a case where the alignment camera 210 was located below the support socket 230, and there was a case where a close-up camera was needed because there was not enough space at the bottom, in this case, a relatively expensive camera was used.

Alignment camera 210 may be configured to photograph the alignment state of the camera module placed on the support socket, and may be secured at a predetermined position. When the manager initially determines the location of the alignment camera 210, the location of the alignment camera 210 may not be changed unless there are special circumstances. A special circumstance may be a case where a long time has passed since the alignment camera 210 was initially fixed, or a position of the alignment camera 210 has been changed by an external force. Since the position of the alignment camera 210 is fixed in this way, the manager's effort for the inspection system 200 can be reduced, and since the position of the camera module is measured at the fixed position, the alignment state of the camera module can be accurately determined. Also, the object in the image taken by the alignment camera 210 may be always shown in the same size.

The inspection system 200 may include an inspection board driving unit 260. The inspection board driving unit 260 may be coupled to the upper side of the base unit 250, be located in a first direction of the alignment stage 220, and be configured for moving the inspection board 240 in a first direction or in a direction opposite to the first direction. The test board driving unit 26 may be coupled to the upper surface of the test board accommodating unit 311.

The inspection board driving unit 260 may include a driving unit base, a first direction guide shaft 261, a guide block 262, and an inspection board coupling unit 263. The inspection board driving unit 260 may include a driving unit base to be coupled with the base unit 250. A first direction guide shaft 261 may be formed on the upper side of the driving unit base. The first direction guide shaft 261 may extend in the first direction. The inspection board driving unit 260 may include a guide block 262 moving along the first direction guide shaft 261. For example, the guide block 262 may have a nut engaged with the first direction guide shaft 261, and the guide block 262 may move in the first direction or in a direction opposite to the first direction according to the direction of rotation of the first direction guide shaft 261. The guide block 262 may be coupled to the inspection board coupling unit 263. The inspection board coupling unit 263 may be configured to couple the inspection board 240 and the guide block 262. The inspection board 240 may move in a first direction or in a direction opposite to the first direction together with the inspection board coupling unit 263.

A lower side of the second direction movement stage may include a slider. The slider of the second direction movement stage is coupled to the second direction guide rail of the base stage to slide in the second direction or in a direction opposite to the second direction.

The inspection system 200 may include an inspection board 240. The inspection board 240 may be coupled to an upper side of the inspection board driving unit 260. In addition, the inspection board 240 may be configured to inspect the camera module on the support socket 230. The inspection board 240 may be coupled with the camera module to perform inspection.

The inspection board 240 may include an inspection sub-board 241. The inspection sub-board 241 may move up and down with respect to the inspection board 240. After the inspection board 240 moves in the opposite direction to the first direction and is located above the camera module, the inspection sub-board 241 descends so that the connector of the camera module and the connector of the inspection sub-board 241 can be connected. Accordingly, the inspection board 240 may perform an inspection of the camera module. However, it is not limited thereto, and the inspection board 240 may be coupled with the camera module while moving up and down.

Hereinafter, the operation of the inspection system 200 by the control unit 100 will be described in detail.

Figure 5:
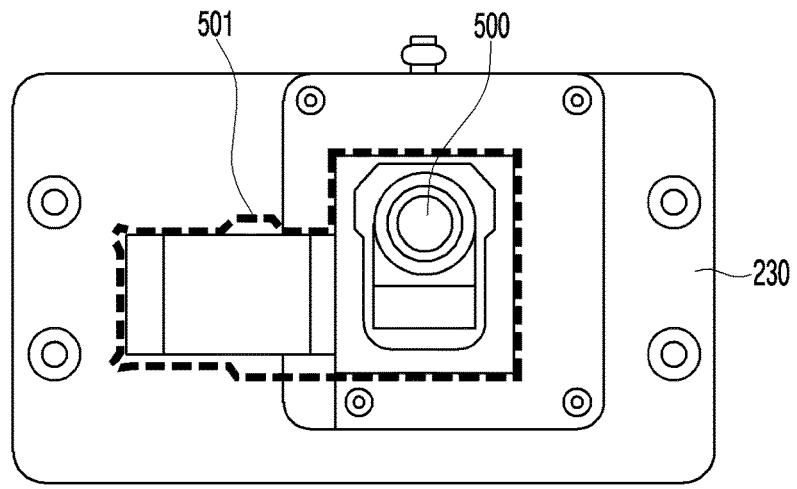
FIG. 5 explains why the inspection system according to an embodiment of the present disclosure needs to check the alignment state of the camera module.
Figure 5:
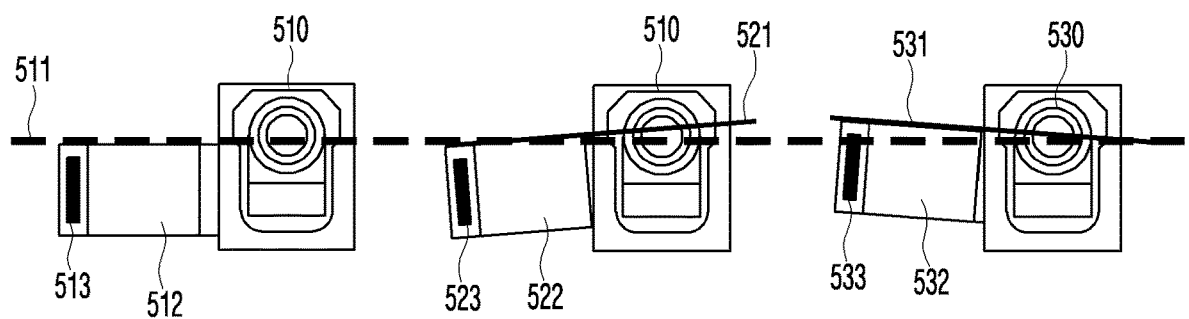

FIG. 5 explains why the inspection system according to an embodiment of the present disclosure needs to check the alignment state of the camera module.

Referring to FIG. 5(a), an accommodation groove 501 for accommodating the camera module 500 may be formed on the upper surface of the support socket 230. The camera module 500 may be accommodated in the accommodation groove 501 of the support socket 230 for inspection. The accommodation groove 501 formed in the support socket 230 may be slightly larger than the camera module 500 in order to easily accommodate the camera module 500. Accordingly, the camera module 500 may be moved minutely within the support socket 230. Also, there may be cases where a connector coupled to the camera module is coupled to the camera module at an angle due to an error in the assembly process.

Referring to FIG. 5(b), the camera module 510 may be perfectly aligned. For example, an extension cable 512 from the camera module 510 to the connector 513 may be parallel to the alignment line 511.

The camera module 520 and the camera module 530 may be in a non-aligned state. Extension directions 521 and 531 of the extension cables 522 and 532 from the camera modules 520 and 530 to the connectors 523 and 533 may form a predetermined angle with the alignment line 511. When trying to combine the connectors 523 and 533 of the camera modules 520 and 530 with the connector formed on the inspection board 240, the connector of the inspection board 240 or the connector 523 533 of the camera modules 520 and 530 may be damaged. Therefore, alignment of the camera module may need to be necessarily performed prior to inspection. Therefore, the following process is performed.

Figure 6:
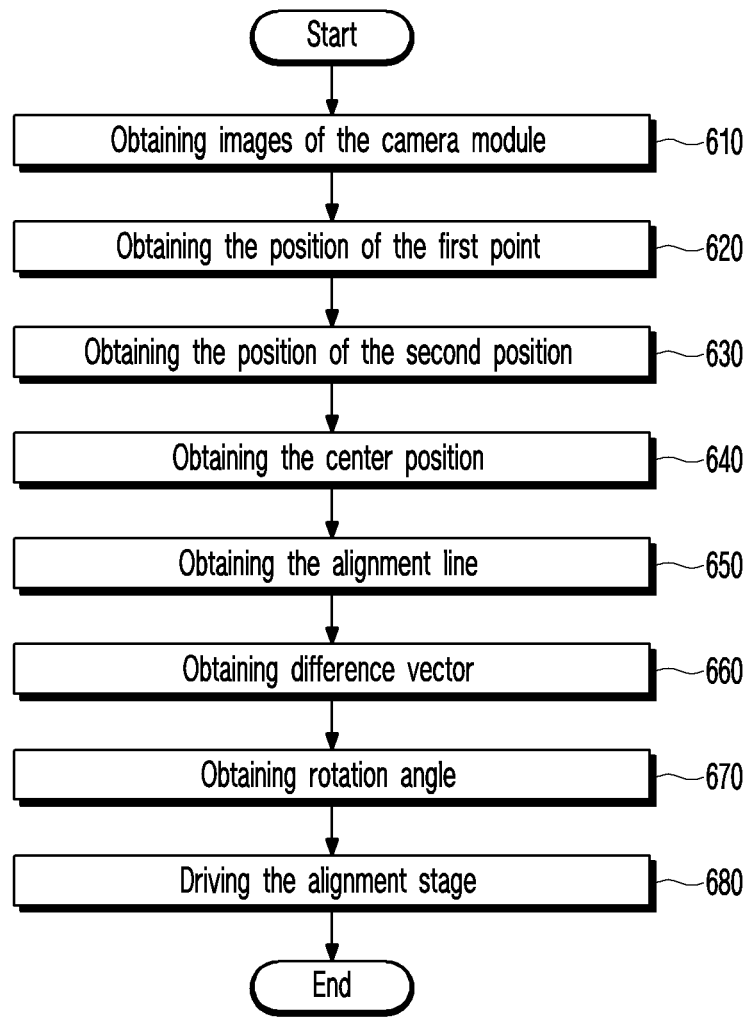
FIG. 6 is a flowchart illustrating an operation of an inspection system according to an embodiment of the present disclosure.
Figure 7:
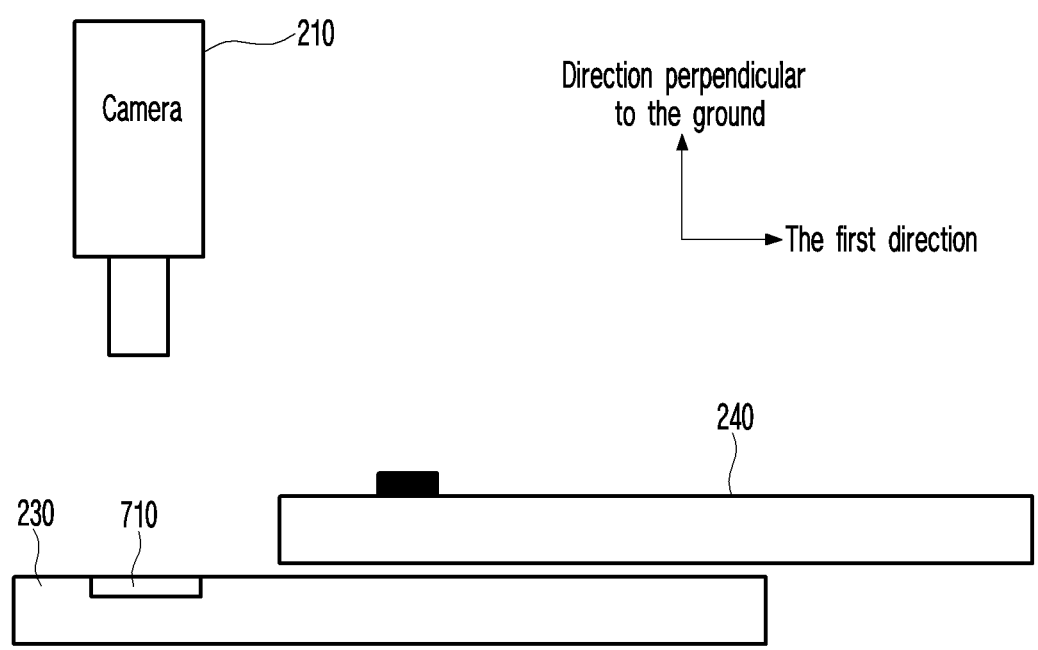
FIG. 7 is a drawing for explaining the operation of an inspection system according to an embodiment of the present disclosure.
Figure 8:
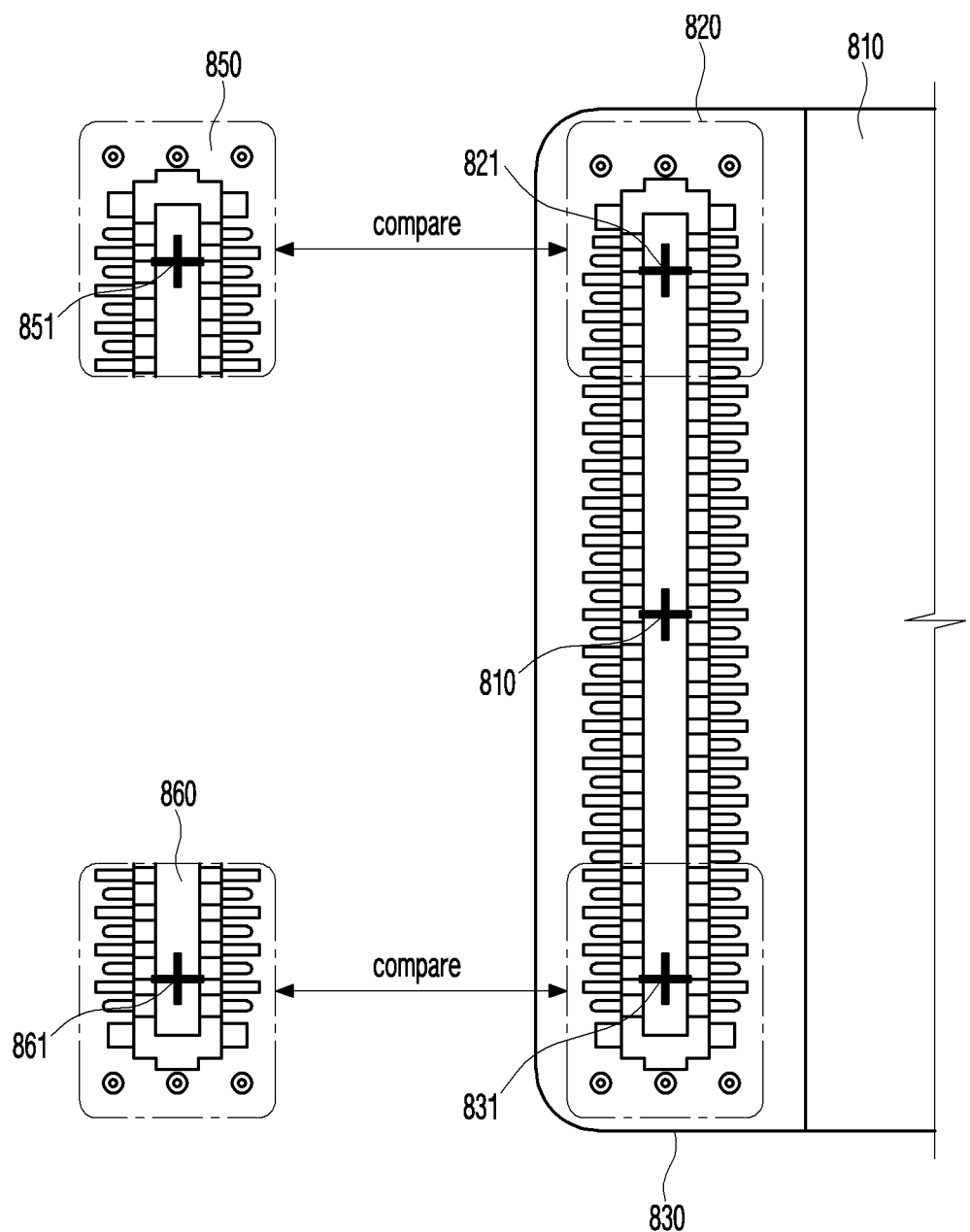
FIG. 8 is a drawing for explaining the operation of an inspection system according to an embodiment of the present disclosure.
Figure 9:
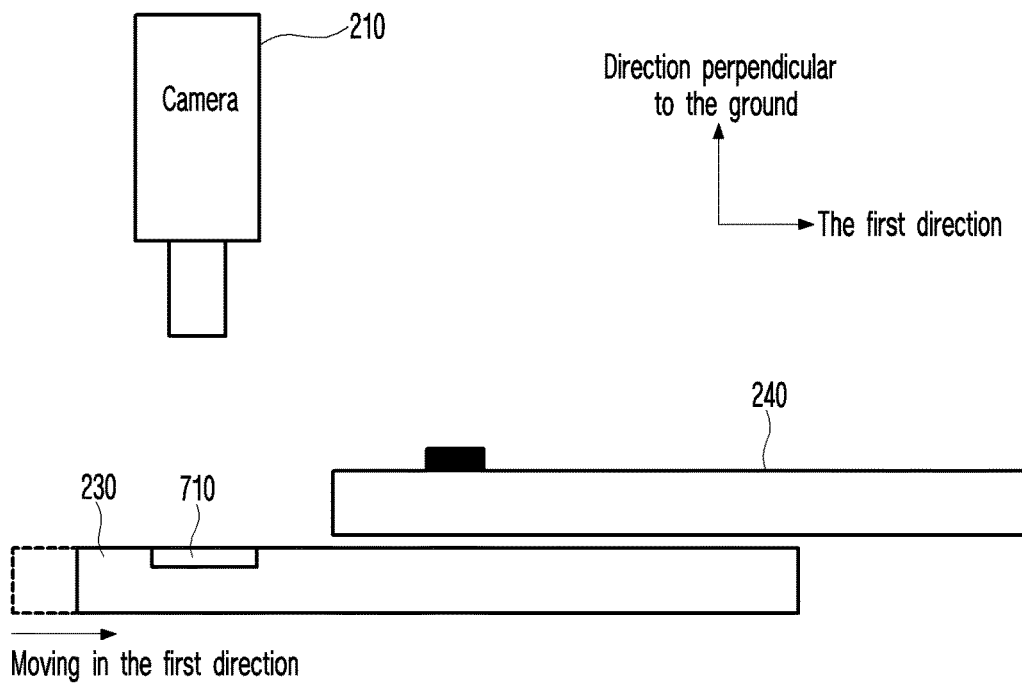
FIG. 9 is a drawing for explaining an operation of an inspection system according to an embodiment of the present disclosure.

FIG. 6 is a flowchart illustrating an operation of an inspection system according to an embodiment of the present disclosure. FIG. 7 is a drawing for explaining the operation of an inspection system according to an embodiment of the present disclosure. FIG. 8 is a drawing for explaining the operation of an inspection system according to an embodiment of the present disclosure. FIG. 9 is a drawing for explaining an operation of an inspection system according to an embodiment of the present disclosure.

Referring to FIGS. 6 and 7, the inspection system 200 may inspect the camera module 710. The inspection system 200 may perform the following process to inspect the camera module. More specifically, the control unit 100 may control components included in the inspection system 200 to perform the following operations.

The alignment camera 210 may perform step 610 of obtaining an image 810 of the camera module by photographing a predetermined area of the camera module 710 on the support socket 230. The predetermined area may be an area of a connector coupled to the camera module 710. For example, FIG. 8 may show an image 810 of a camera module capturing a predetermined area.

The control unit 100 may compare the image 810 of the camera module with the first pattern image 850 to perform step 620 of obtaining the position 821 of the first point included in the image of the camera module. The first pattern image may be a pre-stored template image. The first pattern image may be an image stored in the control unit 100 before obtaining the image 810 of the camera module. The first pattern image may be an image of one side of the connector of the camera module.

The first pattern image 850 may include a positioning point 851 at a predetermined location. In FIG. 8, the positioning point 851 is displayed on the first pattern image 850 for convenience of explanation, but the positioning point 851 may not be displayed on the first pattern image. The control unit 100 may determine a specific position of the first pattern image 850 as a positioning point 851. The position of the positioning point 851 may be previously determined. The control unit 100 may store the coordinates of the positioning point 851 for the first pattern image. The positioning point 851 may be at least one of the center, upper left, upper right, lower left, or lower right points of the first pattern image 850, but it is not limited to this.

A step 620 of obtaining the location of the first point 620 may further include the following process. The control unit 100 may perform a step of determining a first region 820 most similar to the first pattern image 850 in the image 810 of the camera module. The size of the first region 820 may be the same as that of the first pattern image 850. To determine the first region 820, the control unit 100 may use a predetermined pattern matching algorithm. The control unit 100 may perform a step of obtaining a position within the first region 820 corresponding to the position of the positioning point 851 of the first pattern image 850 as the position 821 of the first point.

A step of obtaining the location within the first region as the location 821 of the first point may include the following process. When the similarity between the first region 820 and the first pattern image 850 is less than a predetermined threshold similarity, the control unit 100 may perform a step of outputting a signal indicating that there is an error in the camera module 710. Both ends of the connector coupled to the camera module 710 may perform inspection or be crushed during assembly process. The control unit 100 may obtain a similarity between the first pattern image 850 and the first region 820 of the image 810 of the camera module. The control unit 100 determines the first region 820 most similar to the first pattern image 850 in the image 810 of the camera module, but when the obtained similarity is less than a predetermined threshold similarity, the image 810 of the camera module or the connector of the camera module 710 may be determined to have a problem. For example, the control unit 100 may determine that the connector of the camera module 710 is crushed. The control unit 100 may perform a step of outputting a signal indicating that the camera module 710 has a problem. Also, the control unit 100 may not perform steps 620 to 680. A user may take necessary actions based on the signal output from the inspection system 200.

When the similarity between the first region 820 and the first pattern image 850 is greater than or equal to the threshold similarity, the control unit 100 may perform a step of obtaining a position within the first region 820 corresponding to the position of the positioning point of the first pattern image 850 as the position 821 of the first point. That is, when the similarity between the first region and the first pattern image is greater than or equal to the threshold similarity, the control unit 100 may perform steps 620 to 680.

The control unit 100 compares the image 810 of the camera module with the second pattern image 860, and perform a step 630 of obtaining the position 831 of the second point included in the image 810 of the camera module. The second pattern image 860 may be a pre-stored template image. The second pattern image 860 may be an image stored in the control unit 100 before obtaining the image 810 of the camera module. The second pattern image 860 may be an image of the other side of the connector of the camera module. The other side of the connector shown in the second pattern image 860 may be the opposite side of the one side of the connector shown in the first pattern image 860.

The second pattern image 860 may include a positioning point 861 at a predetermined location. In FIG. 8, the positioning point 861 is displayed on the second pattern image 860 for convenience of description, but the positioning point 861 may not be displayed on the second pattern image 860. The control unit 100 can determine a specific position of the second pattern image 860 as a positioning point 861. The position of the positioning point 861 may be previously determined. The control unit 100 may store the coordinates of the positioning point 861 for the second pattern image 860. The positioning point 861 may be at least one of the center, upper left, upper right, lower left, or lower right points of the second pattern image 860, but it is not limited to this.

The second pattern image 860 may be a mirror image or an image rotated by 180 degrees of the first pattern image 850. The size of the second pattern image 860 may be the same as that of the first pattern image 850. The second pattern image 860 may be a mirror image of the first pattern image 850 on a horizontal axis. The control unit 100 may determine a mirror image or 180 degree rotation image of the first pattern image 850 as the second pattern image 860. That is, the control unit 100 may determine the first pattern image 850 and the second pattern image 860 using one pattern image.

A step 630 of obtaining the location of the second point may further include the following process. The control unit 100 may perform a step of determining a second region 830 most similar to the second pattern image 860 in the image 810 of the camera module. The size of the second region 830 may be the same as that of the second pattern image 860. To determine the second region 830, the control unit 100 may use a predetermined pattern matching algorithm. The control unit 100 may perform a step of obtaining a position within the second region 830 corresponding to the position of the positioning point 861 of the second pattern image 860 as the position 831 of the second point.

Obtaining the second region viewing position as the second point position may include the following process. When the similarity between the second region 830 and the second pattern image 860 is less than a threshold similarity, the control unit 100 may perform a step of outputting a signal indicating that there is an error in the camera module 710. Both ends of the connector coupled to the camera module 710 may perform inspection or be crushed during assembly process. The control unit 100 may obtain a similarity between the second pattern image 860 and the second region 830 of the image 810 of the camera module. The control unit 100 determines the second region 830 most similar to the second pattern image 860 in the image 810 of the camera module, but when the obtained similarity is less than a predetermined threshold similarity, the image 810 of the camera module or the connector of the camera module 710 may be determined to have a problem. For example, the control unit 100 may determine that the connector of the camera module 710 is crushed. The control unit 100 may perform a step of outputting a signal indicating that the camera module 710 has a problem. Also, the control unit 100 may not perform steps 620 to 680. A user may take necessary actions based on the signal output from the inspection system 200.

When the similarity between the second region 830 and the second pattern image 860 is greater than or equal to the threshold similarity, a step of obtaining a position in the second region corresponding to the position of the positioning point of the second pattern image 860 as the position 831 of the second point may be performed. That is, when the similarity between the second region 830 and the second pattern image 860 is greater than or equal to the threshold similarity, the control unit 100 may perform steps 620 to 680.

After obtaining the position of the second point 630, the control unit 100 may perform the following process. After step 630, the control unit 100 may perform a step of determining a difference distance between the position of the first point and the position of the second point. The control unit 100 may obtain a difference distance by subtracting the coordinate value of the position 831 of the second point from the coordinate value of the position 821 of the first point. Alternatively, the control unit 100 may obtain the difference distance by subtracting the coordinate value of the position 821 of the first point from the coordinate value of the position 831 of the second point. A unit of the difference distance may be the number of pixels.

The control unit 100 may perform a step of determining an absolute value of a difference between the difference distance and the predetermined basic distance. The basic distance is a predetermined value, which may be stored by the control unit 100. A unit of the basic distance may be the number of pixels. The basic distance may be a length that a connector coupled to the camera module 710 must satisfy. The basic distance may be input in advance by a system designer and may be changed by a user's input.

The control unit 100 may obtain an absolute value after subtracting the difference distance and the basic distance. The control unit 100 may perform a step of outputting a signal indicating that there is an error in the camera module when the absolute value is greater than or equal to a predetermined tolerance. That is, when the difference between the difference distance and the basic distance is too large, the control unit 100 may determine that there is a problem with the connector of the camera module 710 or a problem with the image of the camera module 710. The control unit 100 may output a signal indicating that there is a problem with the connector of the camera module 710 or that there is a problem with the image of the camera module 710. Also, the control unit 100 may not perform steps 620 to 680. A user may take necessary actions based on the signal output from the inspection system 200.

When the absolute value is less than a predetermined tolerance, the control unit 100 may perform a step of obtaining the center position or alignment line. That is, the control unit 100 may perform steps 620 to 680.

The control unit 100 may perform step 640 of obtaining the central position 840 of the position 821 of the first point and the position 831 of the second point. In addition, the control unit 100 may perform step 650 of obtaining an alignment line connecting the position 821 of the first point and the position 831 of the second point.

The control unit 100 may perform step 660 of obtaining a difference vector between the center position 840 and a predetermined reference position. The control unit 100 may obtain a difference vector by subtracting the coordinate value of the reference position from the coordinate value of the center position 840. However, the present invention is not limited thereto, and the control unit 100 may obtain a difference vector by subtracting the coordinate value of the center position 840 from the coordinate value of the reference position. As for the coordinate values, the x-axis value may increase toward the right, and the y-axis value may increase toward the bottom, starting with the upper-left pixel of the image 810 of the camera module as the origin. A difference vector can have a magnitude and a direction. A process of obtaining the reference position will be described later.

The control unit 100 may perform step 670 of obtaining a rotation angle between an alignment line and a predetermined reference line. The rotation angle may be a value having a rotation magnitude and a rotation direction. The control unit 100 may determine whether the alignment line is displaced clockwise or counterclockwise from the reference line in order to determine the rotation direction. Also, the control unit 100 may determine an angle formed between the reference line and the alignment line as the size of rotation. A method of obtaining the reference line will be described later.

The control unit 100 may perform step 680 of driving the alignment stage based on at least one of a difference vector and a rotation angle so that the center position 840 is located at the reference position and the alignment line coincides with the predetermined reference line. More specifically, the control unit 100 may drive the first stage 410 or the second stage 420 based on the difference vector. The value of the x-axis of the difference vector may be related to the first-stage stage 410, and the value of the y-axis of the difference vector may be related to the second-stage stage 420. However, it is not limited thereto, and the value of the x-axis of the difference vector may be related to the second-stage stage 420 and the value of the y-axis of the difference vector may be related to the first-stage stage 410. Also, the control unit 100 may drive the third stage 430 based on the rotation angle. FIG. 9 illustrates a state in which the control unit 100 drives the first stage 410 or the second stage 420 based on the difference vector according to an embodiment of the present disclosure.

The control unit 100 may previously store information on how much the first-stage stage 410 or the second stage 420 should be moved in which direction according to the direction (+/−) or magnitude of the difference vector in the x-axis direction. In addition, the control unit 100 may previously store information on how much the second stage 420 or the first stage 410 should be moved in which direction according to the direction (+/−) and magnitude of the difference vector in the y-axis direction. The control unit 100 may determine the size and direction of the motion of the first stage 410 and the second stage 420 by applying the difference vector to previously stored information. Also, the control unit 100 may control the first stage 410 and the second stage 420 to be moved based on the determined size and direction of the movement.

The control unit 100 may previously store information on how much the third stage 430 should be moved according to the size of the rotation angle. Also, the control unit 100 may previously store information on in which direction the third stage 430 should be moved according to the direction of the rotation angle. The control unit 100 may determine the size and direction of the movement of the third stage 430 by applying the rotation angle to previously stored information. In addition, the control unit 100 may control the third stage 430 to move based on the determined magnitude and direction of the movement.

The control unit 100 may repeat steps 610 to 680 so that the center position 840 is located at the reference position and the alignment line coincides with the predetermined reference line.

Hereinafter, a method for automatically determining a reference position and reference line will be described.

Figure 10:
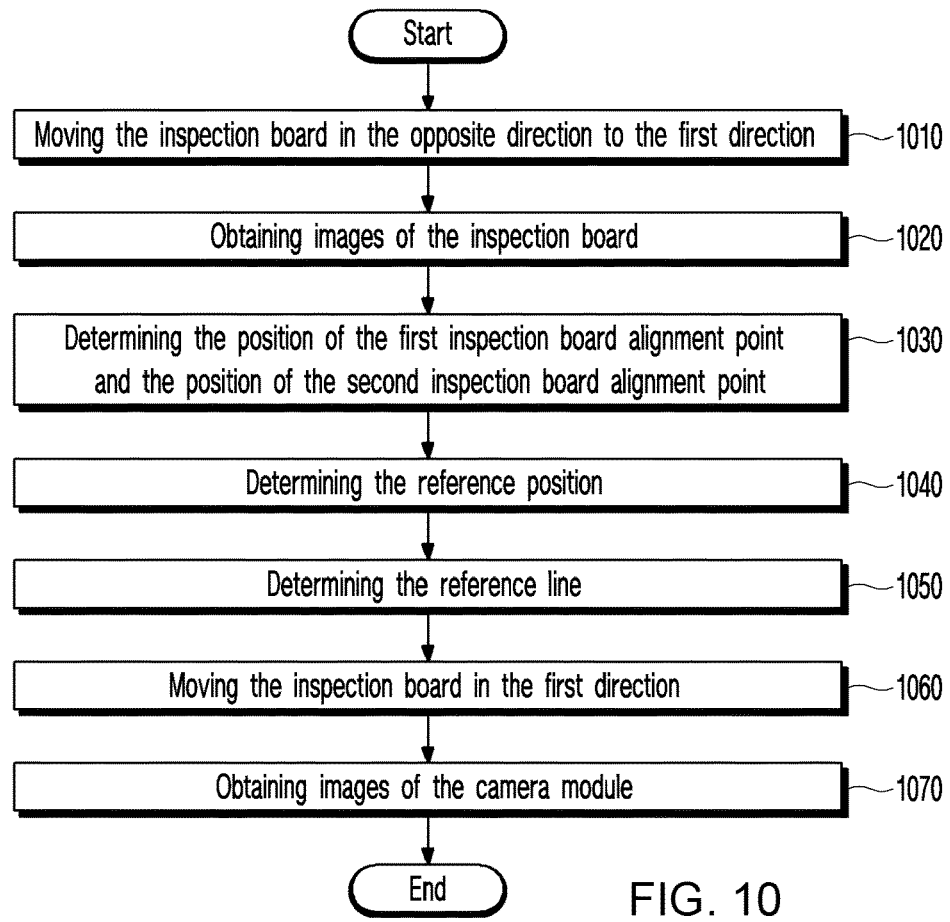
FIG. 10 is a flowchart illustrating an operation of an inspection system according to an embodiment of the present disclosure.

FIG. 10 is a flowchart illustrating an operation of an inspection system according to an embodiment of the present disclosure. Also, FIG. 11 is a drawing for explaining the operation of the inspection system according to an embodiment of the present disclosure.

Figure 11:
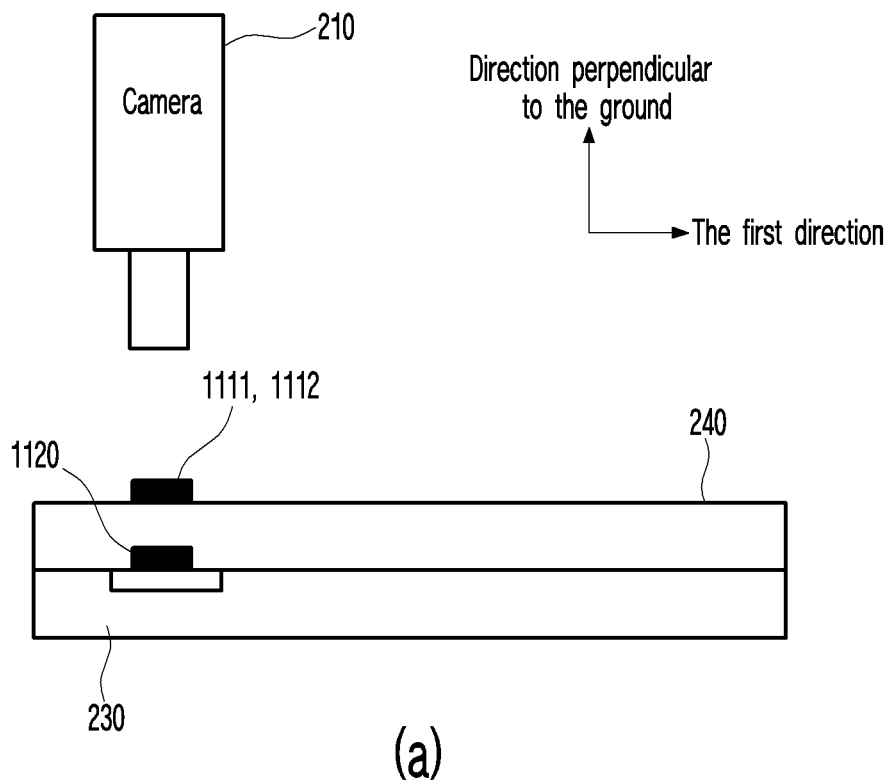
FIG. 11 is a drawing for explaining an operation of an inspection system according to an embodiment of the present disclosure.
Figure 11:
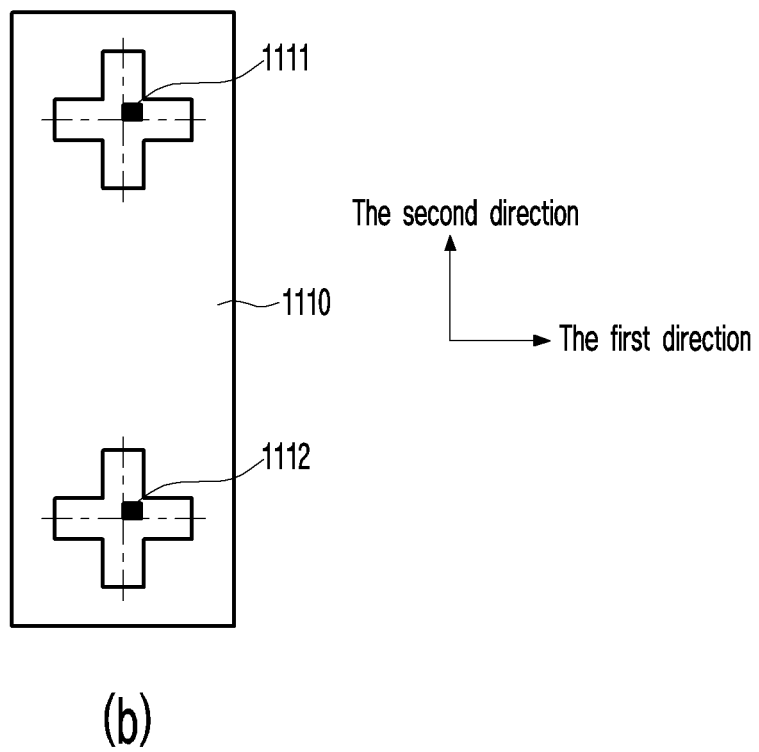

First, referring to FIG. 11, a first inspection board alignment point 1111 and a second inspection board alignment point 1112 may be displayed on the upper side of the inspection board 240. The first inspection board alignment point 1111 and the second inspection board alignment point 1112 may be formed along the second direction.

Based on the first inspection board alignment point 1111 and the second inspection board alignment point 1112 formed on the upper side of the inspection board 240, the control unit 100 may create a reference position and a reference line. The steps of FIG. 10 may be performed before the steps of FIG. 6 are performed. Also, the steps of FIG. 10 may not be performed every time the camera module is inspected. When the steps of FIG. 10 are performed, since the reference position and reference line are determined, there may be no problem in inspecting a plurality of camera modules thereafter. However, the steps of FIG. 10 may be performed at a predetermined cycle, initial setting is required or may be performed before inspecting the camera module according to the user's needs.

The inspection system 200 may perform the following process. The control unit 100 may perform step 1010 of moving the inspection board 240 in a direction opposite to the first direction by using the inspection board driving unit. FIG. 11(*a*) may indicate a state in which step 1010 has been completed. Referring to FIG. 11(*a*), the inspection board may be positioned above the support socket 230 by step 1010. In step 1010, the inspection board 240 may be positioned between the alignment camera 210 and the support socket 230. Accordingly, the alignment camera 210 may photograph the inspection board 240. Moving the inspection board 240 in a direction opposite to the first direction may be moving the inspection board 240 to an inspection position. However, the camera module may not be mounted on the support socket 230, and in the step of FIG. 10, the inspection board 240 does not inspect the camera module, but may be used to create a reference position and reference line.

The control unit 100 may perform step 1020 of obtaining an image of the inspection board 240 using the alignment camera 210. The position of the alignment camera 210 may be the same in step 610 and step 1020. However, since the support socket 230 is covered by the inspection board 240, the alignment camera 210 may obtain an image 1110 of the inspection board 240. An image 1110 of the inspection board 240 may be the same as FIG. 11(*b*).

The control unit 100 may perform step 1030 of determining the position of the first inspection board alignment point and the second inspection board alignment point in the image of the inspection board 240. As already described, the first inspection board alignment point 1111 and the second inspection board alignment point 1112 may be displayed on the upper surface of the inspection board 240. In addition, the first inspection board alignment point 1111 and the second inspection board alignment point 1112 may correspond to the position of the connector 1120 formed on the lower side of the inspection board 240. That is, one side of the connector 1120 is located at a position corresponding to the first inspection board alignment point 1111 on the lower surface of the inspection board 240, and the other side of the connector 1120 is located at a position corresponding to the second inspection board alignment point 1112 on the lower surface of the inspection board 240. The control unit 100 obtains the position of the first inspection board alignment point 1111 and the second inspection board alignment point 1112 in the image of the inspection board 240, thereby recognizing the position of the connector on the lower side of the inspection board 240.

The control unit 100 may perform step 1040 of determining the center of the first inspection board alignment point 1111 and the second inspection board alignment point 1112 as a reference position. The reference position may be the center of a connector located on the inspection board. Also, the center position 840 described above may be the center of a connector coupled to the camera module 710. By matching the reference position and the center position 840 in a later step 680, the positions of the connector of the inspection board and the connector of the camera module 710 can be aligned.

In addition, the control unit 100 may perform step 1050 of determining a line connecting the position of the first inspection board alignment point 1111 and the position of the second inspection board alignment point 1112 as a reference line. The reference line may indicate a longitudinal direction of the connector located on the inspection board. In addition, the alignment line described above may indicate a longitudinal direction of a connector coupled to the camera module 710. By matching the reference line and the alignment line in a later step 680, the positions of the connector of the inspection board 240 and the connector of the camera module 710 can be aligned.

The control unit 100 may perform step 1060 of moving the inspection board in the first direction by using the inspection board driving unit. In step 1060, the camera module 710 may be placed on the support socket 230. Since the reference position and reference line are obtained by performing steps 1010 to 1050, the control unit 100 may perform a step for aligning the camera modules as shown in FIG. 6. For example, the inspection system 200 may place the camera module 710 on the support socket 230. That is, inspection system 200 may be in a state as shown in FIG. 7. In addition, the alignment camera 210 may perform step 610 of obtaining an image of the camera module 710 by photographing a predetermined region of the camera module 710 on the support socket.

Figure 12:
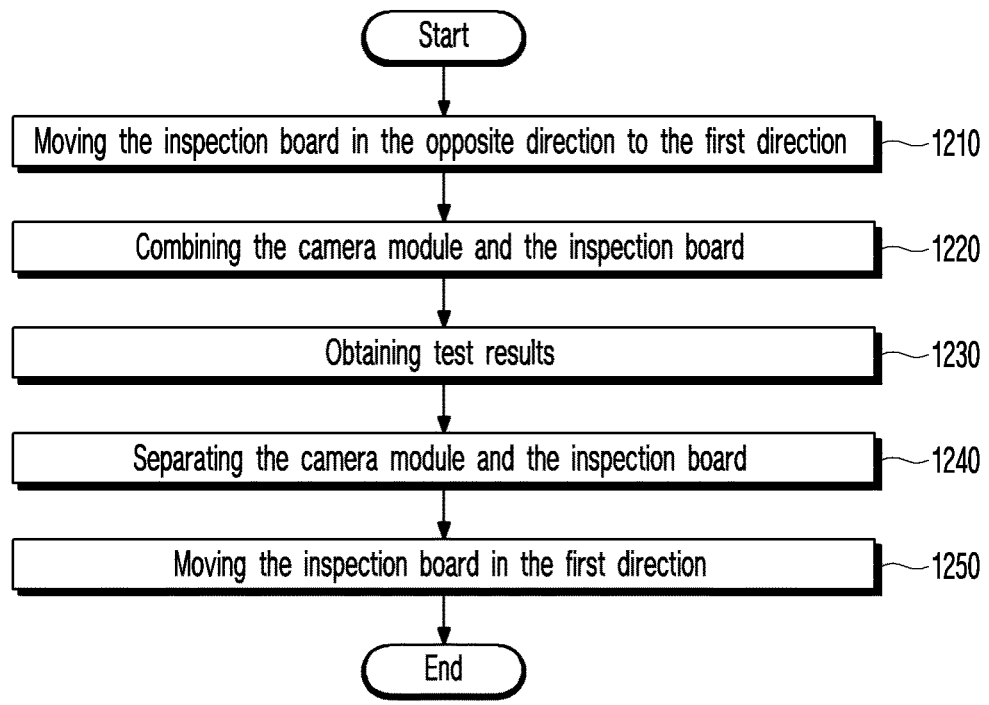
FIG. 12 is a flowchart illustrating an operation of an inspection system according to an embodiment of the present disclosure.
Figure 13:
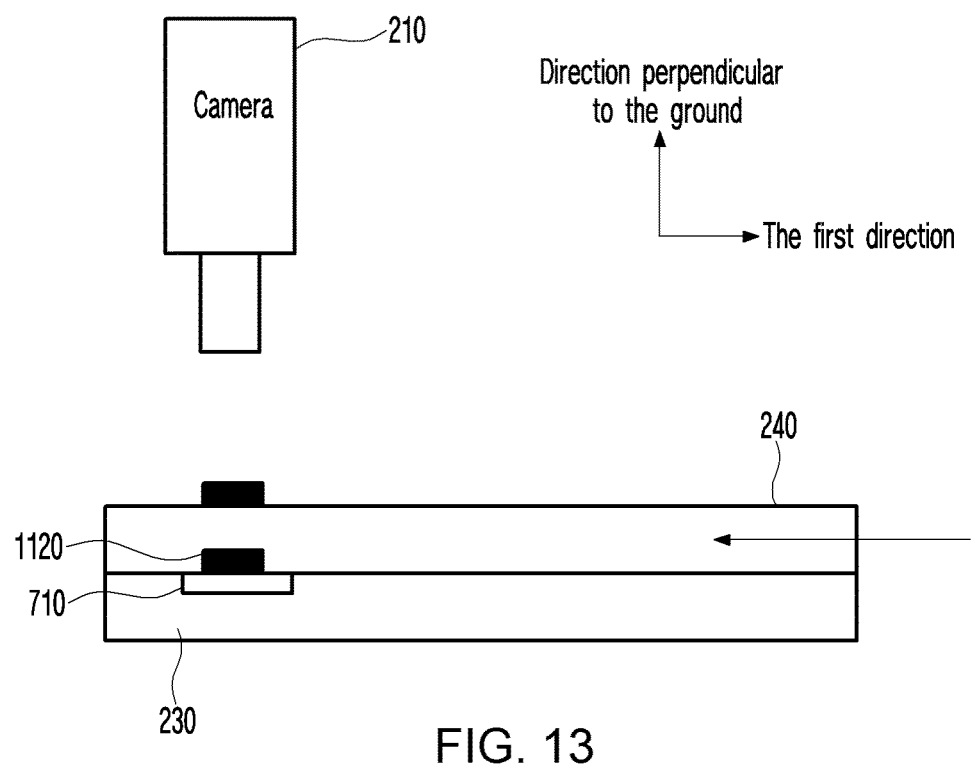
FIG. 13 is a drawing for explaining an operation of an inspection system according to an embodiment of the present disclosure.

FIG. 12 is a flowchart illustrating an operation of an inspection system according to an embodiment of the present disclosure. In addition, FIG. 13 is a drawing for explaining an operation of an inspection system according to an embodiment of the present disclosure.

The steps of FIG. 12 may be performed after the camera modules are aligned by the steps included in FIG. 6.

After driving the alignment stage, the control unit 100 may perform step 1210 of moving the inspection board in a direction opposite to the first direction by using the inspection board driver. Moving the inspection board 240 in a direction opposite to the first direction may mean that the inspection board 240 is positioned above the camera module 710. In addition, the connector of the inspection board 240 may be in a state capable of being coupled with the connector of the camera module 710. Because the steps of FIG. 12 are operations performed after the steps of FIG. 10 and the steps of FIG. 6, the connector of the inspection board 240 is aligned with the connector of the camera module 710 by the steps of FIG. 6.

The control unit 100 may perform step 1220 of coupling the inspection board and the camera module on the support socket by moving the inspection board 240 downward. The inspection board 240 is lowered so that the connector of the inspection board 240 and the connector of the camera module 710 can come into contact. However, it is not limited thereto, and the inspection sub-board 241 included in the inspection board 240 descends so that the connector of the inspection board 240 and the connector of the camera module 710 may come into contact. By step 1210, the inspection system 200 may be in a state as shown in FIG. 13.

Unlike FIGS. 7 and 9, it can be seen in FIG. 13 that the inspection board 240 is close to the support socket 230.

The control unit 100 may perform step 1230 of obtaining a test result by testing the camera module using the inspection board. After the connector of the inspection board 240 and the connector of the camera module 710 come into contact, the inspection board 240 may perform inspection while exchanging signals with the camera module 710. In addition, the inspection board 240 may obtain a test result based on the movement of the camera module and the signal received from the camera module.

The control unit 100 may perform step 1240 of separating the camera module and the inspection board by moving the inspection board upward. That is, after obtaining the test result, the connector of the inspection board 240 and the connector of the camera module 710 may be separated. In addition, the control unit 100 may perform step 1250 of moving the inspection board in the first direction by using the inspection board driving unit. As such, the inspection system 200 can quickly align the camera module using the hardware structure of FIG. 2 and the steps of FIG. 6 and accurately obtain test results by performing the steps of FIG. 12.

So far, we have looked at various embodiments. Those of ordinary skill in the art to which the present invention pertains will understand that the present invention can be implemented in a modified form without departing from the essential characteristics of the present invention. Therefore, the disclosed embodiments should be considered from an illustrative rather than a limiting point of view. The scope of the present invention is shown in the claims rather than the foregoing description, and all differences within the equivalent scope will be construed as being included in the present invention.

On the other hand, the above-described embodiments of the present invention can be written as a program that can be executed on a computer, and can be implemented in a general-purpose digital computer that operates the program using a computer-readable recording medium. The computer-readable recording medium includes storage media such as magnetic storage media (e.g., ROM, floppy disk, hard disk, etc.) and optical reading media (e.g., CD-ROM, DVD, etc.).

What is claimed is:

1. A method of operating an inspection system for inspecting a camera module including a control unit, an alignment camera, an alignment stage, and a support socket, the method comprising:
   obtaining an image of the camera module by photographing a predetermined region of the camera module above the support socket by the alignment camera;
   comparing the image of the camera module with the first pattern image to obtain a position of a first point included in the image of the camera module;
   comparing the image of the camera module with a second pattern image to obtain a position of a second point included in the image of the camera module;
   obtaining a central position of the position of the first point and the position of the second point;
   obtaining an alignment line connecting the position of the first point and the position of the second point;
   obtaining a difference vector between the center position and a predetermined reference position;
   obtaining a rotation angle between the alignment line and a predetermined reference line; and
   driving the alignment stage based on at least one of the difference vector and the rotation angle so that the center position is located at the reference position and the alignment line coincides with a predetermined reference line.

2. The method of operating an inspection system according to claim 1,
   wherein the inspection system includes:
   a base unit constituting a framework of the inspection system;
   an alignment stage coupled to the upper side of the base unit and for determining the direction of the support socket;
   a support socket coupled to the upper side of the alignment stage and for supporting the camera module;
   an alignment camera spaced apart from the upper side of the support socket by a predetermined distance and fixed at a predetermined position in order to photograph an alignment state of the camera module placed on the support socket;
   an inspection board driving unit coupled to an upper side of the base unit, positioned in a first direction of the alignment stage, and configured to move an inspection board in the first direction or in a direction opposite to the first direction; and
   an inspection board coupled to the upper side of the inspection board driving unit and for inspecting the camera module on the support socket, and
   wherein the first direction is a direction parallel to the ground.

3. The method of operating an inspection system according to claim 2,
   wherein the alignment stage may include a first stage coupled to an upper side of the base unit to move the support socket in a second direction or in a direction opposite to the second direction;
   a second stage coupled to an upper side of the first stage to move the support socket in the first direction or in a direction opposite to the first direction; and
   a third stage coupled to the upper side of the second stage to rotate the support socket about an axis perpendicular to the ground; and
   wherein the first direction and the second direction are perpendicular to each other.

4. The method of operating an inspection system according to claim 1,
   wherein The first pattern image and the second pattern image include a positioning point at a predetermined position, and
   wherein obtaining the position of the first point comprises:
   determining a first region most similar to a first pattern image in the image of the camera module; and
   obtaining a position in the first region corresponding to the position of the positioning point of the first pattern image as the position of the first point,
   wherein obtaining the position of the second point comprises:
   determining a second region most similar to a second pattern image in the image of the camera module; and
   obtaining a position in the second region corresponding to the position of the positioning point of the second pattern image as the position of the second point, and
   wherein the second pattern image is a mirror image or an image rotated by 180 degrees of the first pattern image.

5. The method of operating an inspection system according to claim 4, wherein obtaining a position within the first region as the position of the first point comprises:

outputting a signal indicating that there is an abnormality in the camera module when the similarity between the first region and the first pattern image is less than a predetermined threshold similarity; and obtaining a position in the first region corresponding to the position of the positioning point of the first pattern image as the position of the first point contains steps, when the similarity between the first region and the first pattern image is greater than or equal to the threshold similarity, and wherein obtaining a position in the second region as the position of the second point comprising:

outputting a signal indicating that there is an abnormality in the camera module when the similarity between the second region and the second pattern image is less than the threshold similarity; and obtaining a position in the second region corresponding to the position of the positioning point of the second pattern image as the position of the second point, when the similarity between the second region and the second pattern image is greater than or equal to the threshold similarity.

6. The method of operating an inspection system according to claim 1, comprising:

determining a difference distance between the position of the first point and the position of the second point after the step of obtaining the position of the second point;

determining an absolute value of a difference between the difference distance and a predetermined basic distance;

outputting a signal indicating that there is an abnormality in the camera module when the absolute value is greater than or equal to a predetermined tolerance; and obtaining the center position or the alignment line when the absolute value is less than a predetermined tolerance.

7. The method of operating an inspection system according to claim 2, wherein a first inspection board alignment point and a second inspection board alignment point are displayed on the upper side of the inspection board, and the method of operating an inspection system comprises:

moving the inspection board in a direction opposite to the first direction by using the inspection board driving unit;

obtaining an image of the inspection board using the alignment camera;

determining the position of the first inspection board alignment point and the second inspection board alignment point in the image of the inspection board;

determining the center of the position of the first inspection board alignment point and the position of the second inspection board alignment point as the reference position;

determining a line connecting the position of the first inspection board alignment point and the position of the second inspection board alignment point as the reference line;

moving the inspection board in the first direction by using the inspection board driving unit; and obtaining an image of the camera module by the alignment camera photographing a predetermined region of the camera module on the support socket.

8. The method of operating an inspection system according to claim 7, comprising:

moving the inspection board in a direction opposite to the first direction by using the inspection board driving unit after the step of driving the alignment stage;

moving the inspection board downward to couple the camera module and the inspection board on the support socket;

obtaining a test result by testing the camera module using the inspection board;

separating the camera module and the inspection board by moving the inspection board upward; and moving the inspection board in the first direction by using the inspection board driving unit.

* * * * *